Figure 1:
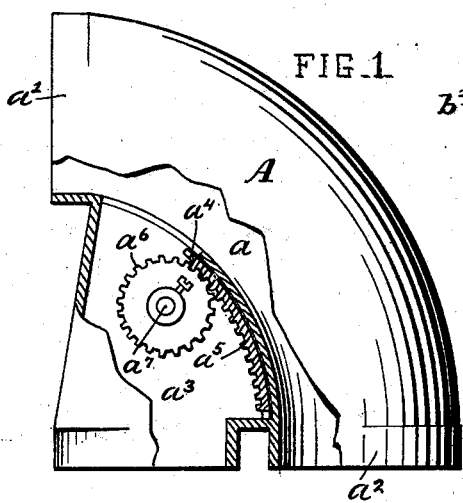

No. 654,690. Patented July 31, 1900.
W. TOWNSEND.
PNEUMATIC DESPATCH TUBE.
(Application filed Sept. 14, 1899.)
(No Model.) 5 Sheets—Sheet 1.

WITNESSES:
F. B. Townsend
Robert N. Holt

INVENTOR.
William Townsend,
By Samuel N. Pond,
his ATTORNEY.

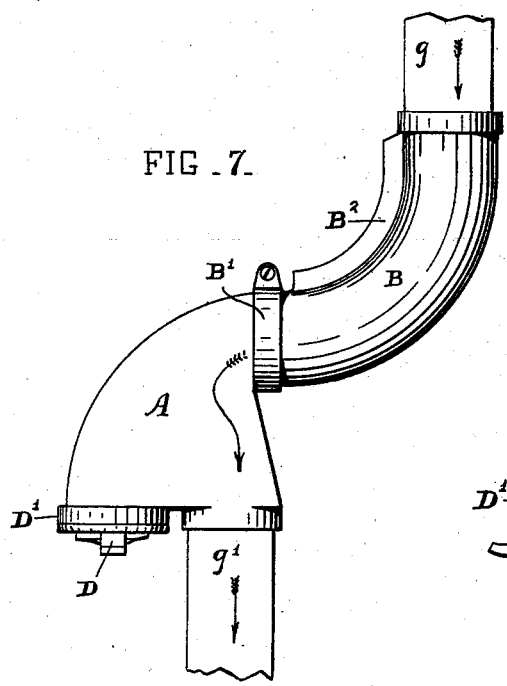
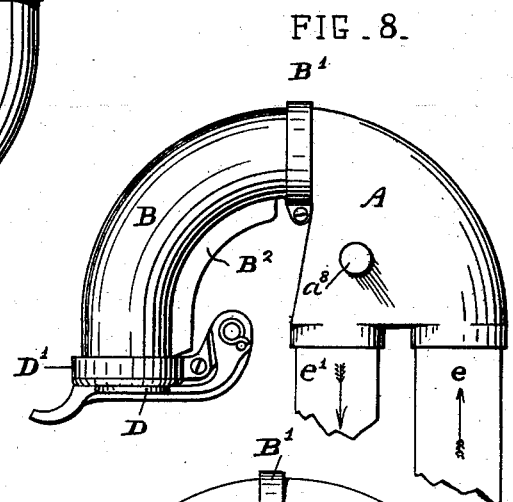
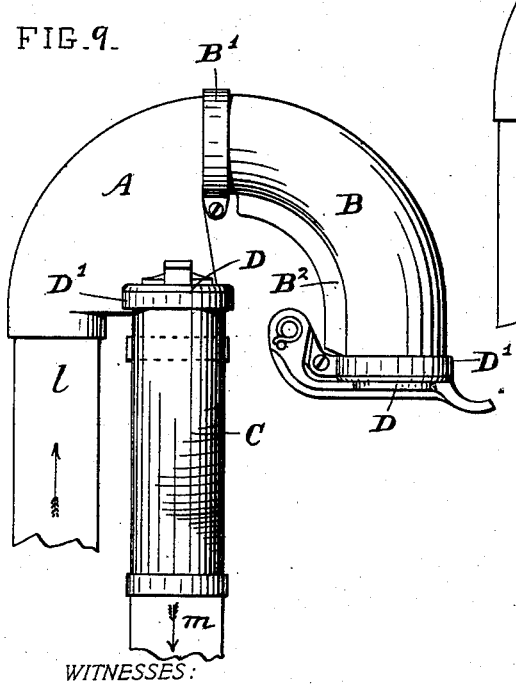
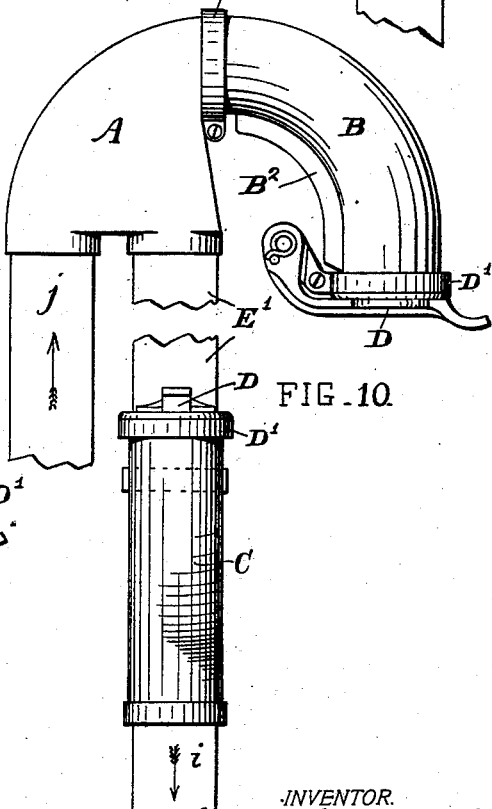

No. 654,690. Patented July 31, 1900.
W. TOWNSEND.
PNEUMATIC DESPATCH TUBE.
(Application filed Sept. 14, 1899.)
(No Model.) 5 Sheets—Sheet 3.
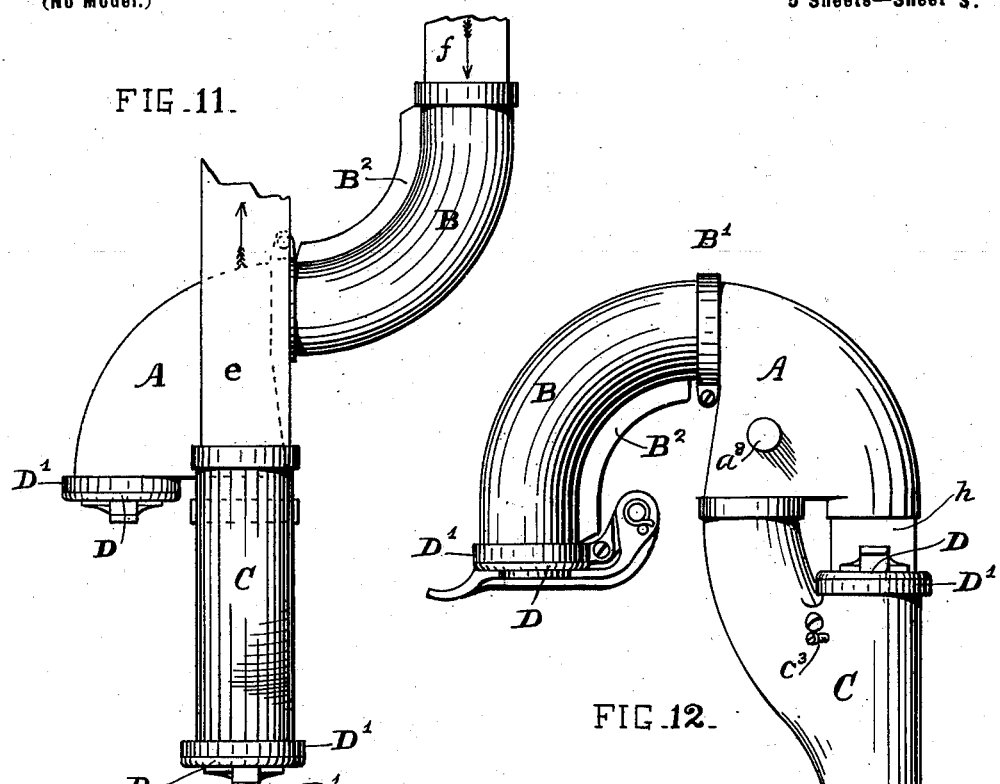
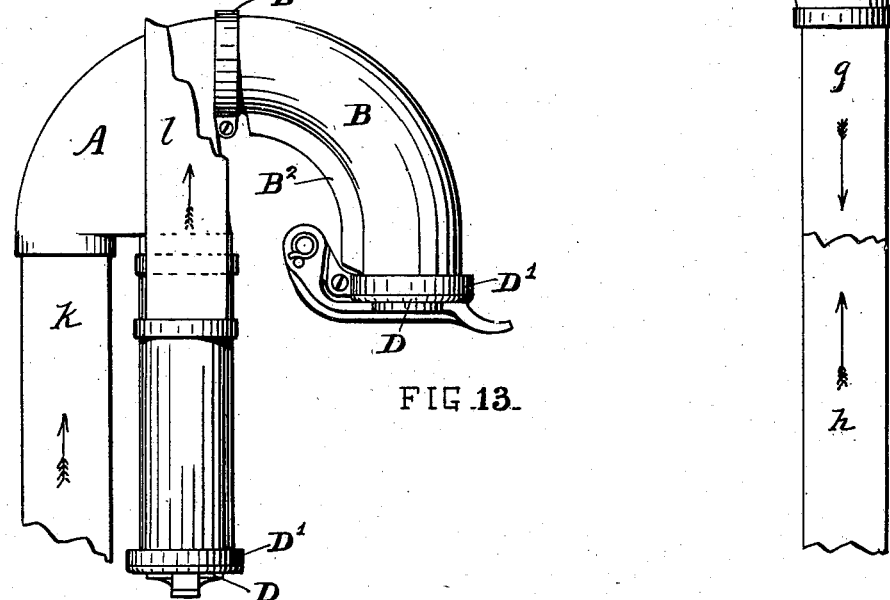
WITNESSES:
F. B. Townsend,
Robert N. Holt.
INVENTOR.
William Townsend,
By Samuel N. Pond,
his ATTORNEY.
THE NORRIS PETERS CO., PHOTO-LITHO., WASHINGTON, D. C.

No. 654,690. Patented July 31, 1900.
W. TOWNSEND.
PNEUMATIC DESPATCH TUBE.
(Application filed Sept. 14, 1899.)
(No Model.) 5 Sheets—Sheet 4.

WITNESSES:
F. B. Townsend
Robert N. Holt

INVENTOR.
William Townsend,
By Samuel N. Pond,
his ATTORNEY.

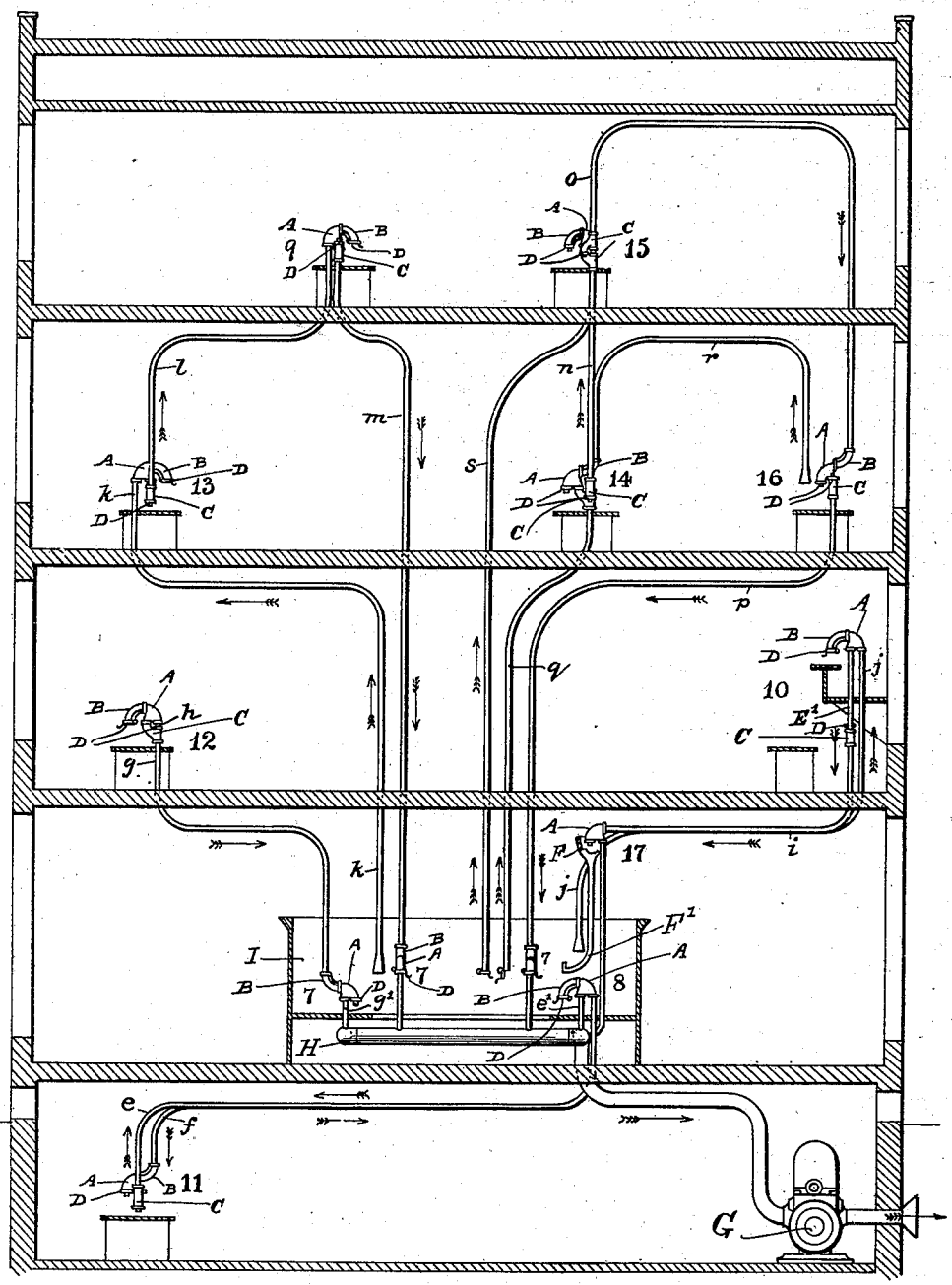

UNITED STATES PATENT OFFICE.

WILLIAM TOWNSEND, OF CHAMPAIGN, ILLINOIS, ASSIGNOR TO TRUMAN W. MILLER, OF CHICAGO, ILLINOIS; HARRIET B. MILLER AND FELIX BABBAGE EXECUTORS OF SAID TRUMAN W. MILLER, DECEASED.

PNEUMATIC-DESPATCH TUBE.

SPECIFICATION forming part of Letters Patent No. 654,690, dated July 31, 1900.

Application filed September 14, 1899. Serial No. 730,467. (No model.)

*To all whom it may concern:*

Be it known that I, WILLIAM TOWNSEND, a citizen of the United States, residing at Champaign, in the county of Champaign and State of Illinois, have invented certain new and useful Improvements in Terminals for Pneumatic-Despatch Systems, of which the following is a specification.

My invention has relation primarily to pneumatic store-service apparatus of the character now extensively in use in large stores in which cash, messages, parcels, &c., are transferred to and fro between a main cashier's or operating station and a large number of outlying salesmen's stations located at various places all over the building through a series of pneumatic tubes connecting the cashier's or operating station with each of the outlying salesmen's stations; and the object of my invention is to produce what might be termed a "universal" terminal—that is, a terminal the individual parts or elements of which are capable of being assembled in a large variety of forms to suit the requirements of different stations at which terminals are placed.

In the practical installation of pneumatic store-service and similar pneumatic-despatch systems in large buildings the exigencies of space, the widely-varying arrangements of counters, shelving, aisles, wrappers' stalls, &c., and numerous other considerations require often within a single plant or system a large variety in the arrangement of the conveying-tubes and the receiving and despatching terminals, particularly at the salesmen's ends of the line. Where the cashier's or main operating station is located in the basement, as is usually the case, the receiving and despatching terminals at the salesmen's ends will usually be of the type known as the "upward-discharge" terminal. Where such cashier's station is located on the top floor of a building, the salesmen's terminals will ordinarily be of the kind known as the "downward-discharge" terminal. Where the cashier's station is located on an intermediate floor, some of the salesmen's terminals will be of the former and some of the latter type. Again, the exigencies of space and the particular arrangement of the conveying-tubes may require in some cases terminals having an upward discharge and also an upward transmission, and in other cases terminals having a downward discharge and also a downward transmission. Without attempting here to enumerate all the various forms and types of terminals which in actual practice are found to to be necessary to suit the almost-limitless variety of conditions governing the installation of pneumatic store-service systems, I may note what in reality is a very obvious fact that the necessity, hereinabove alluded to, of such a variety in the form, proportions, construction, and arrangement of terminals involves a large expense in the construction and installation of the systems over and above what the expense would be were all the terminals uniform and alike in form, proportions, construction, and arrangement. These terminals are generally made up from metal castings (usually brass) and have to be of considerable thickness and weight to withstand the shock and strain to which they are subjected by the propelling air-current and the rapidly-moving carriers, and where these castings have to be made in a large variety of forms and proportions to suit various forms and types of terminals the expense involved in the preparation of the necessary working drawings, the construction of patterns and other prerequisites of their manufacture, is a very considerable item in the total cost of installing a system. I have set forth these considerations with some particularity in order the more clearly to emphasize the salient purpose or object of my present invention, which is to provide a terminal for pneumatic store-service and other pneumatic-despatch systems which, as hereinabove stated, shall be in the nature of a universal terminal—that is, a terminal built up out of certain component parts or elements which are capable of being assembled and connected together in a large variety of ways in order to produce out of these same elements or component parts a large variety of terminals, which at the present time and in the present state of the art, so far as I am aware, require a special construction, involving special castings, &c., for each terminal.

My invention is illustrated in the accompanying drawings, in which—

Figure 2:
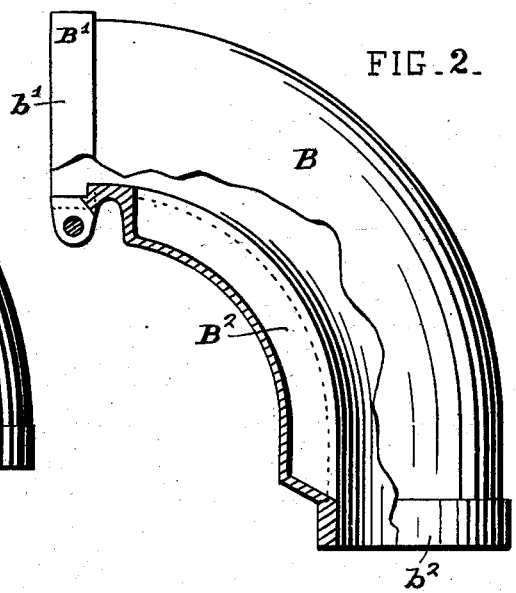
Figure 3:
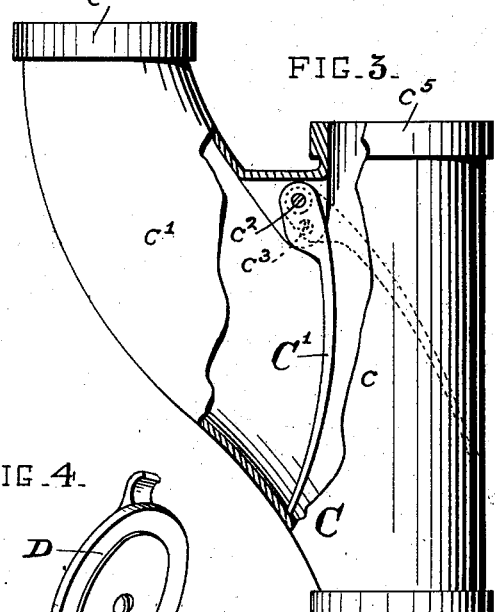
Figure 6:
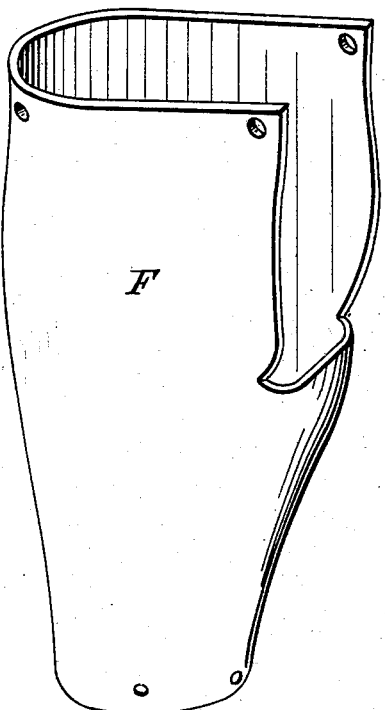
Figure 4:
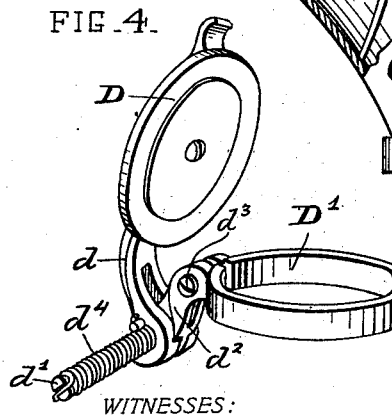
Figure 5:
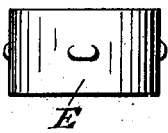

Figures 1 to 4, inclusive, are detail views of the four essential mechanical elements of my invention, Figs. 1, 2, and 3 being in side elevation partly broken away to show interior mechanism, and Fig. 4 being in perspective. Fig. 5 is an elevation of a thin metal ring or short sleeve in the nature of an internal ferrule, which is my preferred means for effecting the union of certain of the parts. Fig. 6 is a perspective in elevation of a hopper or upper member of a chute used in connection with one of the forms of terminal. Figs. 7 to 17, inclusive, are views in elevation of various forms and types of terminals which are constructed by the union in different ways of some or all of the elemental parts shown in Figs. 1 to 4, inclusive; and Fig. 18 is a general diagrammatic view of the interior of a store or other building, showing a typical pneumatic store-service system therein in which are embodied and combined in cooperative relation the various forms and types of terminals specifically shown in Figs. 7 to 17.

Similar letters and numerals of reference refer to similar parts throughout the several views.

The usual terminal at a salesman's station in a pneumatic store-service system comprises a box or casing having suitable guides to direct the passage of carriers therethrough and in communication with two tubes through which a continuous air-current is maintained by a suitable air exhauster or blower connected therewith, the carrier being transmitted from the salesman's terminal to the cashier's station through one of these tubes, usually termed the "sending-tube," and returned from the cashier's station to the salesman's terminal through the other, commonly known as the "return-tube." In order to prevent interruption of the air-current flowing through the tubes, both the opening through which a carrier is discharged and that through which it is transmitted in a salesman's terminal are commonly guarded by a door or flap normally held closed by gravity or spring action or by the suction within the tubes, or by both, while at the cashier's end of the line the discharging-aperture is of course guarded by such a flap; but the sending-aperture, being the point at which the suction in the system begins, is in exhaust systems left open.

In carrying out my invention I have devised four specially formed, proportioned, and constructed parts or elements, as shown in Figs. 1 to 4, inclusive, by the various unions or combinations of which I am able to secure the large variety of terminals above referred to. The first of these parts (shown in Fig. 1 and designated as a whole by A) comprises a quadrant-shaped casting interiorly divided so as to form a curved guide $a$ for the passage therethrough in either direction of a carrier and a short stub-section $a^3$ for the return passage of the propelling-current. Communication between the parts $a$ and $a^3$ is regulated and controlled by an arc-shaped sliding valve $a^4$, whose path of movement is along the curved line formed by the intersection of the parts $a$ and $a^3$. This valve may be actuated and set in any desired position to cut off the current more or less by a rack-and-pinion mechanism $a^5$ $a^6$, the latter being actuated by a thumb-nut $a^8$, Figs. 8, 12, and 15, on the end of the pinion-shaft $a^7$. The ends $a'$ $a^2$ of the curved guide $a$, which are in planes at right angles to each other, are rounded and smoothed to receive clamping-rings B' and D', respectively, Figs. 2 and 4, as hereinafter explained.

Referring next to Fig. 2, this view shows the second essential element of my device, which consists of an arc-shaped elbow casting B of sufficient internal diameter to permit of the easy passage therethrough of a carrier, and having its two open ends $b'$ and $b^2$ in planes at right angles to each other, as shown. On the inner curve of the elbow and extending approximately from one end to the other is formed an air by-pass $B^2$, the function of which will be explained later. The end $b'$ has a clamping-ring B', while the end $b^2$ is adapted in some forms of the invention to receive the clamping-ring D', Fig. 4, and in others to be entered by a straight section of conveying-tube, as will be hereinafter explained.

Fig. 3 shows in detail the third essential part or element of my device. This comprises what I term a "branched" casting C, formed of a short straight tube-section $c$ and a slightly-longer curved branch section $c'$, communicating laterally with the section $c$. The communication of these sections $c$ and $c'$ for the passage of carriers therethrough is controlled by a switch C', pivotally secured at $c^2$ and adapted to hang loosely in some forms of the invention and to be fixedly secured in position across either section $c$ or $c'$ in others by means of a set-screw $c^3$. The three open ends $c^4$, $c^5$, and $c^6$ of the casting C are all in different but parallel planes, and each of these ends is adapted in the various forms of the invention to receive the clamping-ring D' and door or flap D, Fig. 4.

In Fig. 4 I have shown the fourth essential element of my invention. This comprises a detachable spring-actuated door or flap D, hinged by its shank $d$ on pivot-bolt $d'$, the latter being carried by the shank $d^2$ of a split ring D', adapted to be clamped by means of a bolt $d^3$. The flap D is normally held in a closed position against the ring D' by means of a coil-spring $d^4$, as shown. This device (shown in Fig. 4) is in the various forms of my invention, illustrated in Figs. 7 to 17, inclusive, adapted to be applied to all the other three parts A, B, and C, according to the requirements of each individual terminal, all as hereinafter fully explained.

Referring now to Figs. 7 to 17, inclusive, I have therein shown a few of the numerous types of terminals now in practical use in pneumatic store-service and other systems which may be obtained by combination of some or all of the parts or elements of my present invention, said parts requiring no alteration in form, proportions, or structure whatever and being merely assembled and connected together, preferably, by means of the short sleeve E, Fig. 5, or by a similar but longer section of tubing or by the split rings B' and D'. The particular means employed for connecting the parts is not, however, of the essence of the invention.

Fig. 7 shows the usual downwardly-discharging cashier's terminal. This as constructed by my invention is composed of the parts A, B, and D, connected together in the relation shown by the split rings B' and D'. The section of conveying-tube $g$, through which the carrier arrives from the salesman's station, enters the elbow-casting B at its end $b^2$, and $g'$ is the exhaust-tube leading to the exhaust main or blower, whereby the current is maintained in the system, the direction of movement of the current being indicated by arrows in all the views.

Fig. 8 shows an upwardly-discharging cashier's terminal. This comprises the same elements (A, B, and D) as Fig. 7, but differently united and arranged. The parts A and B are connected together, as in Fig. 7; but the part B is turned down relatively to the part A through a half-circle and forms the discharging-section of the device, the flap D being secured to its lower end. In this form of terminal and in all other forms in which the part B is the section through which the carrier is finally discharged, as in Figs. 9, 10, 12, 13, and 15, the by-pass $B^2$ performs the function of preventing compression of the air in advance of the carrier and suction of the propelling-current in its rear to such an extent as to prevent its free and proper discharge by permitting the escape of the air from the front to the rear of the carrier as it travels through the part B. Such a by-pass is not needed on the quadrant A in such terminals as those shown in Figs. 7, 11, 14, 16, and 17, for the reason that the propelling-current in passing from section $a$ to section $a^3$ of the quadrant follows the carrier down nearly to the point of its discharge. The tube $e$ from the salesman's station joins the terminal at the end $a^2$ of the quadrant A, and $e'$ is the tube leading to the exhaust.

In Fig. 9 is shown a salesman's terminal in which the carriers are both received and transmitted at the level of the counter. This terminal is made up from all the parts A B C D and the sleeve or ferrule E, the flap D closing both the discharging and transmitting ends of this and all the other salesmen's terminals shown. This terminal is like that above described in connection with Fig. 8 with the transmitter added, the part C being joined at its end $c^5$ to the part A by the internal sleeve E and being connected at its lower end $c^6$ to the tube $m$, leading to the cashier's station. The switch C' may either hang loosely or be set in the dotted-line position, Fig. 3. The tube 1, by which the carrier returns from the cashier's station, is connected to the part A at its end $a^2$, as shown, and the discharging and transmitting flaps D are secured by the split rings D' to the ends $b^2$ and $c^4$ of the parts B and C, respectively.

The terminal shown in Fig. 10, also a salesman's terminal, is similar in all respects to that last described, except that the carriers are not received and transmitted at the same level, they being transmitted at the level of the counter, but returned with the sale-check and any change to the elevated stall of the parcel-wrapper, usually above and just in rear of the counter. This arrangement is provided for by simply connecting the parts A and C by a straight section of conveying-tube E' of the required length instead of by the short ferrule E and otherwise connecting the terminal to the sending and return tubes $i$ and $j$, respectively, exactly as in Fig. 9.

A terminal having a downward discharge and an upward transmission is shown in Fig. 11. This terminal employs all four of the elements A, B, C, and D connected together, as shown, the parts A and C being united by the sleeve E. The elbow B connects the end $a'$ of the quadrant-casting A with the return-tube $f$ in a manner similar to that shown in Fig. 7, the carrier being discharged past the flap D, guarding the end $a^2$ of the quadrant. The sending-tube $e$ joins the branch $c'$ of the part C at its upper end $c^4$, and the carrier to be transmitted to the cashier's station is introduced through the lower end $c^6$ of the straight section $c$, the switch C' being set to the position indicated by dotted lines in Fig. 3 to permit the carrier to pass upward through the branch $c'$.

Fig. 12 illustrates a modification of the terminal shown in Fig. 9, showing how the same parts A, B, C, and D may be combined to accommodate a parallel arrangement of sending and return tubes $g$ and $h$, respectively, in a plane at right angles to, instead of parallel and coincident with, the plane of the discharging-carrier's travel. In this terminal the parts are assembled as hereinabove described in connection with Fig. 9, except that the part C is joined to the quadrant A by its branch $c'$ instead of by its straight section $c$, the carrier to be transmitted to the cashier's station being introduced through the upper end $c^5$ of the straight section $c$.

The combination and arrangement of the parts A, B, C, and D to secure a terminal having an upward discharge and an upward transmission are shown in Fig. 13. Here the parts A and B are united and connected to the return-tube $k$, as described in connection with Figs. 9, 10, and 12, the lower or discharging end of the elbow B being guarded by a flap D and the part C being connected by sleeve E to the quadrant A by its branch $c'$, as in Fig. 12. This terminal, it will be observed, is substantially like that shown in Fig. 12, with the sending-tube $l$ and the flap D reversed as to their connection with the straight section $c$ of the part C, so as to provide an upward instead of a downward transmission.

Figure 14:
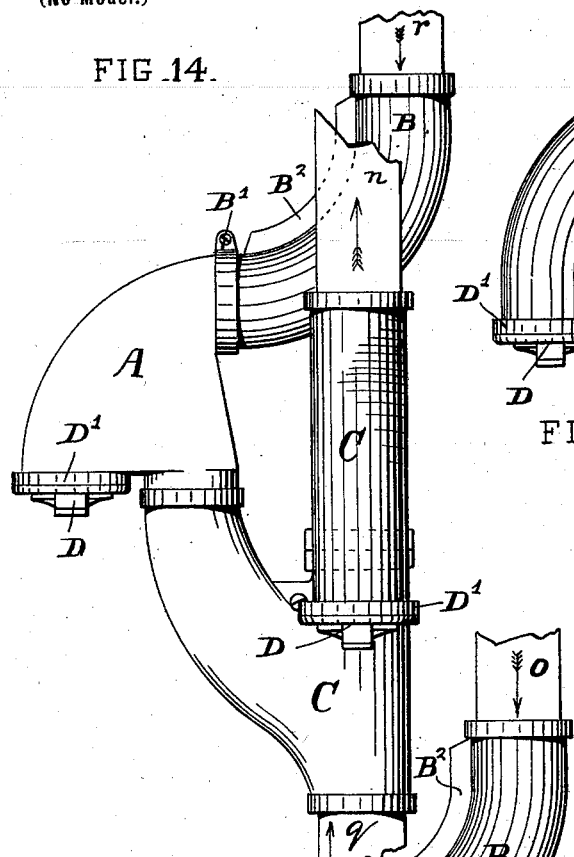
Figure 15:
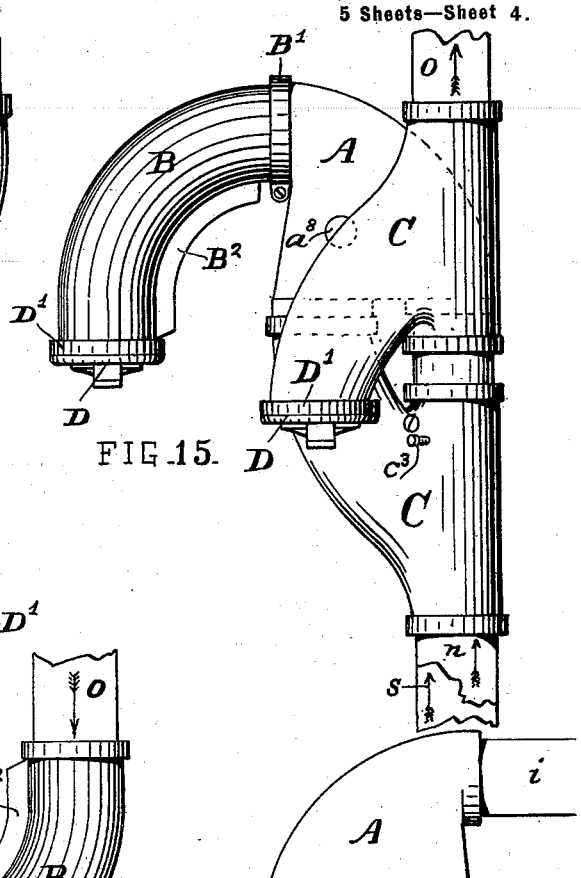

In Figs. 14 and 15 I have shown downwardly and upwardly discharging terminals, respectively, which are adapted for use in systems employing what is known in the art as a "shifting current." An example of such a system is shown in the patent to Edmond A. Fordyce, No. 570,163, dated October 27, 1896. In such systems a constant propelling current is not maintained through all of the salesmen's terminals, but the current may be "shifted," as it is called, at the cashier's desk, so as to be sent through any desired terminal, the others meanwhile being idle or "dead," or so as to bring some outlying station which has not an independent circuit connection with the cashier's station into communication therewith through some other salesman's station. Referring first to Fig. 14, this terminal is seen to be similar to that shown in Fig. 11 in that it has a downward discharge and an upward transmission; but in this case neither the sending or return tubes $n$ and $r$, respectively, are in direct connection with the cashier's station, but only indirectly through another salesman's station 16, as will be seen by reference to Fig. 18, to be explained hereinafter. Provision is made, however, for sending a "through" carrier from the cashier's desk directly through this station (without discharge) to a station 16 beyond by means of a return-tube $q$, connecting the cashier's desk with the lower end of this terminal. In its make-up this terminal comprises the parts A, B, and C, arranged as in Fig. 11, except that the part C is joined to the quadrant A by its curved branch $c'$ instead of by its straight section $c$, and another part C is superimposed upon the first-mentioned part C, the two being united by a sleeve E at their corresponding ends $c^5$, and through the curved branch $c'$ of this latter part C the "local" carrier to be transmitted is introduced, while the through carriers pass this terminal by way of the alined straight sections of the castings C C. In this case the switch C' in the first-mentioned or lower part C is fixed across the branch $c'$, while the switch in the latter or upper part C is allowed to swing loosely upon its pivot to accommodate the passage of both the local and the through carriers. The terminal shown in Fig. 15, like that in Fig. 14, employs two superimposed parts C C to accommodate the passage of both local and through carriers, but in this case of local carrier is received direct from the cashier's desk through a return-tube $s$ and is discharged through the elbow-casting B, while it is transmitted to the cashier's desk through the curved branch $c'$ of the upper part C indirectly by way of station 16, Fig. 18. The through carriers pass this station 15 without discharge by way of tubes $n$ and $o$ and the alined straight sections $c$ $c$ of the castings C C.

Figure 16:
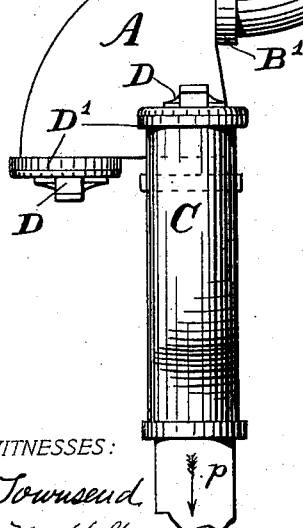

Fig. 16 shows a salesman's terminal having a downward discharge and a downward transmission. This terminal employs the parts A, B, and D assembled, as shown, in the cashier's terminal, Fig. 7, but has combined therewith a sender or transmitter in the form of the casting C, interposed between the quadrant A and the sending-tube $p$, as shown.

Figure 17:
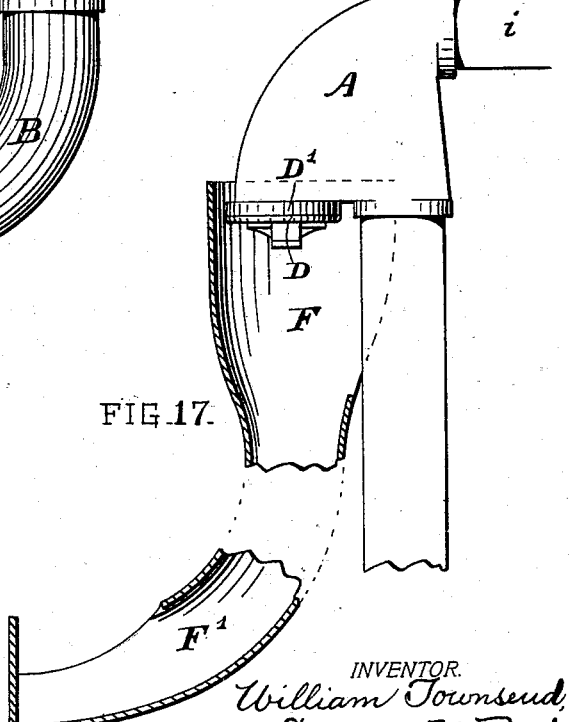

Fig. 17 shows an elevated discharge terminal sometimes employed at the cashier's station and connected to the end of a horizontally-arranged sending-tube $i$. To make this terminal, the quadrant A, provided with the flap D, only is required; but in order to insure the safe delivery of the carrier on the cashier's desk or table a hopper F, terminating in a curved chute F', is employed to receive the carrier on its discharge and guide it to its destination on the cashier's desk or table.

The various forms and types of terminals hereinabove described by no means exhaust the possibilities of my invention, but have been shown and described simply to adequately illustrate its practically universal character. In order to show one way in which these various terminals might be coöperatively united and combined in a single system, reference is had to Fig. 18, which will now be briefly described. The view is in the nature of a diagram, showing a vertical section of a store or other building having four stories and a basement. In the lower right-hand corner of the basement is the exhaust-fan or blower G, connected on its suction side with the exhaust-main H, located beneath the floor of the cashier's or operator's desk I. The terminals shown in this figure I have for the sake of convenience and easy reference designated by numerals corresponding to the numerals of the several figures of the drawings in which these terminals are shown in detail. In the basement is shown the terminal 11, directly connected to the cashier's terminal 8 by sending-tube $e$ and return-tube $f$. On the second floor, to the left, is shown the terminal 12, directly connected to terminal 7 at the cashier's desk by sending-tube $g$ and return-tube $h$. On the same floor, to the right, appears the terminal 10, directly connected to terminal 17 at the cashier's desk by sending-tube $i$ and return-tube $j$. On the third floor, to the left, is terminal 13, which is connected directly to the cashier's desk by a return-tube $k$ and indirectly connected thereto through terminal 9 by a tube 1 (which is a sending-tube relatively to terminal 13 and a return-tube relatively to terminal 9) and by a sending-tube $m$. It will thus be seen that a carrier to be sent from terminal 13 to the cashier's station has to be sent by way of and through terminal 9, while a carrier to be returned from the cashier's station to terminal 9 has to be returned by way of and through terminal 13. On the same floor, in the middle, is shown terminal 14, which is indirectly connected to the cashier's desk through sending-tube $n$, terminal 15, sending-tube $o$, terminal 16, and sending-tube $p$, and also through return-tube $q$, terminal 14, return-tube $n$, terminal 15, return-tube $o$, terminal 16, and return-tube $r$. It will thus be seen that a carrier to be sent from terminal 14 to the cashier's station has to be sent through terminal 15 (without discharge) and through terminal 16, (with discharge,) while a carrier to be returned from the cashier's station to terminal 14 has to be returned through terminals 14 and 15 (without discharge) and through terminal 16, (with discharge,) or else by way of return-tube $s$ and terminals 15 and 16, discharging at both stations. In this connection it will be noted that the tubes $n$ and $o$ are sending-tubes relatively to a carrier to be despatched from terminal 14 and return-tubes relatively to a carrier to be received there. On this same floor, third, to the right, is shown a terminal 16, which is directly connected with the cashier's desk by a sending-tube $p$ and also by return-tubes $o$, $n$, and $q$, running through terminals 15 and 14 (without discharge) and forming, in effect, a single continuous return-tube, and also indirectly by return-tubes $o$ and $s$ and terminal 15, (with discharge.) On the top floor, fourth, at the left, is terminal 9, which communicates directly with the cashier's desk through sending-tube $m$ and indirectly therewith through return-tube $k$, terminal 13, (with discharge,) and return-tube 1. At the right on this floor is the terminal 15, which communicates with the cashier's desk directly through return-tube $s$ and indirectly also through sending-tube $o$, terminal 16, (with discharge,) and sending-tube $p$.

In connection with terminals 14, 15, and 16 and the two return-tubes $q$ and $s$ it is noted that in practice the ends of the latter tubes at the cashier's station will be controlled by valves like those shown in the patent to Edmond A. Fordyce, above referred to, whereby when either valve is opened the other will automatically be closed, and thus the air-current will be passing through only one of the tubes $q$ and $s$ at a time. Thus by alternately opening and closing these valves the current may be "shifted" back and forth between tubes $q$ and $s$ to control the passage of local and through carriers between stations 14, 15, and 16 and the cashier's station, as desired.

I have described my invention hereinabove as primarily designed for use in pneumatic store-service systems; but it will readily be understood that it might with equal advantage be employed in any pneumatic-despatch system wherein carriers, large or small, are transmitted by air suction or pressure from place to place, regardless of distance and of the nature of the matter carried by such carriers. The device hereinabove described, therefore, is not limited to use in connection with pneumatic store-service apparatus, but its application broadly and generally to any form or type of pneumatic-despatch system will be within the purview and spirit of my invention.

Having thus described my invention and illustrated some of the many forms in which it may be embodied and used, what I claim as new, and desire to secure by Letters Patent, is—

1. A composite structure to serve as a terminal of a pneumatic-despatch system, composed of separable parts or elements, said elements being so formed, proportioned and provided with uniting and carrier guiding and controlling parts that they may be assembled together in different relations to vary the completed form of the terminal.

2. In terminal devices for pneumatic-despatch systems, a group of fittings comprising a quadrant-casting, an elbow-casting, and a branched casting, each provided with uniting and carrier guiding and controlling parts, substantially as set forth, adapting two or more of them to be assembled in different relations, whereby the completed form of the terminal may be varied.

3. In terminal devices for pneumatic-despatch systems, in combination the following elements: a quadrant-casting, an elbow-casting, a branched casting comprising a short straight tube-section and a curved branch section communicating laterally therewith, and two doors or flaps; the said elements being so formed, proportioned and provided with uniting and carrier guiding and controlling parts that they may be assembled together in different relations to vary the completed form of the terminal.

4. In terminal devices for pneumatic-despatch systems, in combination the following elements: a quadrant-casting, an elbow-casting, two branched castings each comprising a short straight tube-section and a curved branch section communicating laterally therewith, and two doors or flaps; the said elements being so formed, proportioned and provided with uniting and carrier guiding and controlling parts that they may be assembled together in different relations to vary the completed form of the terminal.

5. In terminal devices for pneumatic-despatch systems, in combination the following elements: a quadrant-casting, an elbow-casting, and a door or flap; the said elements being so formed, proportioned and provided with uniting and carrier guiding and controlling parts that they may be assembled together in different relations to vary the completed form of the terminal.

6. In terminal devices for pneumatic-despatch systems, in combination the following elements: a quadrant-casting having a valve for regulating the flow of the propelling-current, an elbow-casting provided with an air by-pass, a branched casting comprising a short straight tube-section and a curved branch section communicating laterally therewith and having a switch pivoted at the union of said straight and curved sections to control the passage of carriers therethrough, and two spring-actuated doors or flaps; the said elements being so formed, proportioned and provided with uniting parts that they may be assembled together in different relations to vary the completed form of the terminal.

7. In terminal devices for pneumatic-despatch systems, in combination the following elements: a quadrant-casting having a valve for regulating the flow of the propelling-current, an elbow-casting provided with an air by-pass, two branched castings each comprising a short straight tube-section and a curved branch section communicating laterally therewith and having a switch pivoted at the union of said straight and curved sections to control the passage of carriers therethrough, and two spring-actuated doors or flaps; the said elements being so formed, proportioned and provided with uniting parts that they may be assembled together in different relations to vary the completed form of the terminal.

8. In terminal devices for pneumatic-despatch systems, in combination the following elements: a quadrant-casting having a valve for regulating the flow of the propelling-current, an elbow-casting provided with an air by-pass, and a spring-actuated door or flap; the said elements being so formed, proportioned and provided with uniting parts that they may be assembled together in different relations to vary the completed form of the terminal.

9. A terminal for pneumatic-despatch systems comprising a quadrant-casting having formed therethrough a curved guide for the passage of carriers and provided also with a short return-passage for the propelling-current communicating through a valve-controlled passage with said curved guide, in combination with a door or flap adapted to be secured to said quadrant-casting at one end of the curved guide, the other end of said guide being adapted to be entered by a conveying-tube of the system.

10. A terminal for pneumatic-despatch systems comprising a quadrant-casting having formed therethrough a curved guide for the passage of carriers and provided also with a short return-passage for the propelling-current communicating through a valve-controlled passage with said curved guide, in combination with a door or flap adapted to be secured to said quadrant-casting at one end of the curved guide, the other end of said guide being adapted to be entered by a conveying-tube of the system, and a chute having its upper end located around and beneath the discharge-opening of the quadrant-casting to receive and guide carriers to their point of final discharge.

In testimony that I claim the foregoing as my invention I hereunto sign my name this 11th day of September, 1899, in the presence of two witnesses.

WILLIAM TOWNSEND.

Witnesses:
SAMUEL N. POND,
ROBERT N. HOLT.